United States Patent
Szolyga et al.

(10) Patent No.: US 7,929,281 B2
(45) Date of Patent: Apr. 19, 2011

(54) COMPUTER CASE HAVING AN ACTIVE PANEL

(75) Inventors: Thomas H. Szolyga, Saratoga, CA (US); Ashwin V. Lodhia, Mountain View, CA (US); Mark C. Solomon, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 600 days.

(21) Appl. No.: 11/790,461

(22) Filed: Apr. 25, 2007

(65) Prior Publication Data

US 2008/0266773 A1  Oct. 30, 2008

(51) Int. Cl.
*G06F 1/16* (2006.01)
(52) U.S. Cl. .................................. 361/679.04
(58) Field of Classification Search .................. 362/249, 362/600–631; 40/541–546
See application file for complete search history.

(56) References Cited

U.S. PATENT DOCUMENTS

| | | | | |
|---|---|---|---|---|
| 4,709,537 A * | 12/1987 | Ballestrazzi et al. | ............ | 53/550 |
| 6,657,684 B2 * | 12/2003 | Maeda et al. | .................... | 349/63 |
| 7,092,247 B2 * | 8/2006 | Kim | .......................... | 361/679.04 |
| 7,108,414 B2 * | 9/2006 | McCollum et al. | ........... | 362/604 |
| 7,452,098 B2 * | 11/2008 | Kerr | ............... | 362/154 |
| 2009/0196069 A1 * | 8/2009 | Iwasaki | .......................... | 362/613 |
| 2009/0307989 A1 * | 12/2009 | Johnson, Jr. | ...................... | 52/38 |

* cited by examiner

*Primary Examiner* — Anabel M Ton

(57) ABSTRACT

An active panel system for implementation in a computer such that at least one case panel of the computer comprises one or more active panels. An active panel is a device that may be disposed in, or replace, a panel of the computer case. The active panel has a variable transparency which is dynamically or programmatically controllable by a user or a controller. An embodiment of an active panel system may be implemented in a computer, for example, to artistically embellish the computer case as well as to alter the transparency of the case such that the contents of the computer case are viewable from the exterior of the computer case without opening the case.

18 Claims, 7 Drawing Sheets

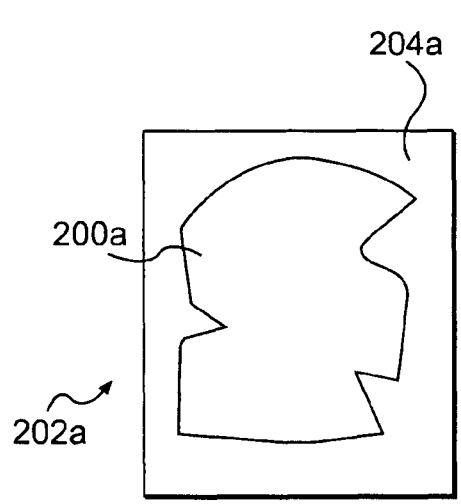
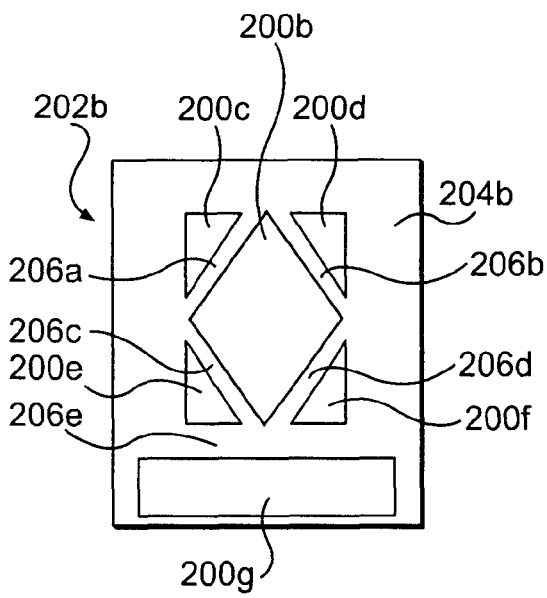
FIG. 2a  FIG. 2b
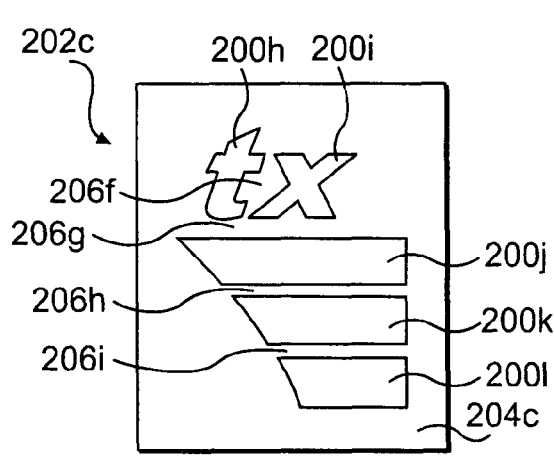
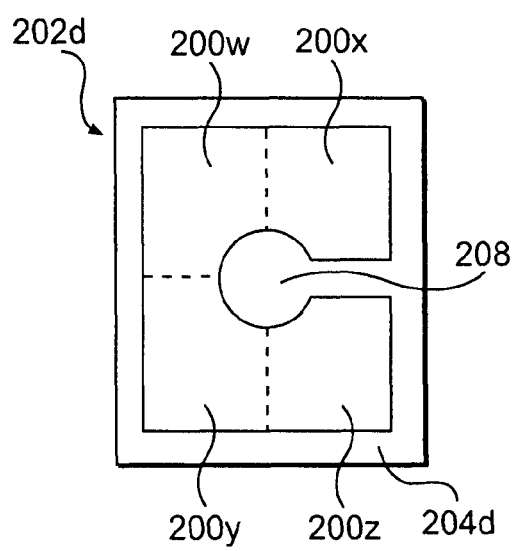
FIG. 2c  FIG. 2d

COMPUTER CASE HAVING AN ACTIVE PANEL

BACKGROUND

1. Field of the Invention

The present invention relates generally to a computer case, and more particularly, to a computer case having an active panel.

2. Related Art

Computers are widespread in many homes and businesses. The enclosure that contains the main components of a computer is typically referred to as a computer case, computer chassis, cabinet, tower, box, enclosure or housing (referred to hereinafter as a "computer case"). Many computers have a computer case that is simply a plain case with little to no artistic aspects. Although practical, such designs are considered by some users as dull or uninteresting. In an effort to customize or personalize computer cases, users sometimes modify their cases with third-party after-market components. This practice is commonly referred to as "case modding." These modifications include painting the case a new color, making the case out of transparent acrylic glass, adding stickers and lights, and providing other artistic embellishments. This practice has expanded the range of styles for computer cases beyond the traditional unadorned cases.

SUMMARY

In one aspect of the present invention, there is a computer case having a plurality of case panels of which at least one case panel comprises an active panel; and a controller configured to control the at least one active panel to adjust an amount of light that passes through the active panel.

BRIEF DESCRIPTION OF THE DRAWINGS

Embodiments of the present invention will be described below in conjunction with the accompanying drawings, in which:

FIG. 2a is view of a case panel having an active panel, in accordance with an embodiment of the present invention;

FIG. 2b is view of a case panel having several different active panels, in accordance with an embodiment of the present invention;

FIG. 2c is view of a case panel having active panels with letter shapes, in accordance with an embodiment of the present invention;

FIG. 2d is view of a case panel having an active panels with an extension, in accordance with an embodiment of the present invention;

DETAILED DESCRIPTION

Aspects of the present invention are generally directed to an active panel system for implementation in a computer such that at least one case panel of the computer comprises one or more active panels. An active panel is a device that may be disposed in, or replace, a panel of the computer case. The active panel has a variable transparency which is dynamically or programmatically controllable by a user or a controller. An embodiment of an active panel system may be implemented in a computer, for example, to artistically embellish the computer case as well as to alter the transparency of the case such that the contents of the computer case are viewable from the exterior of the computer case without opening the case.

Figure 1:
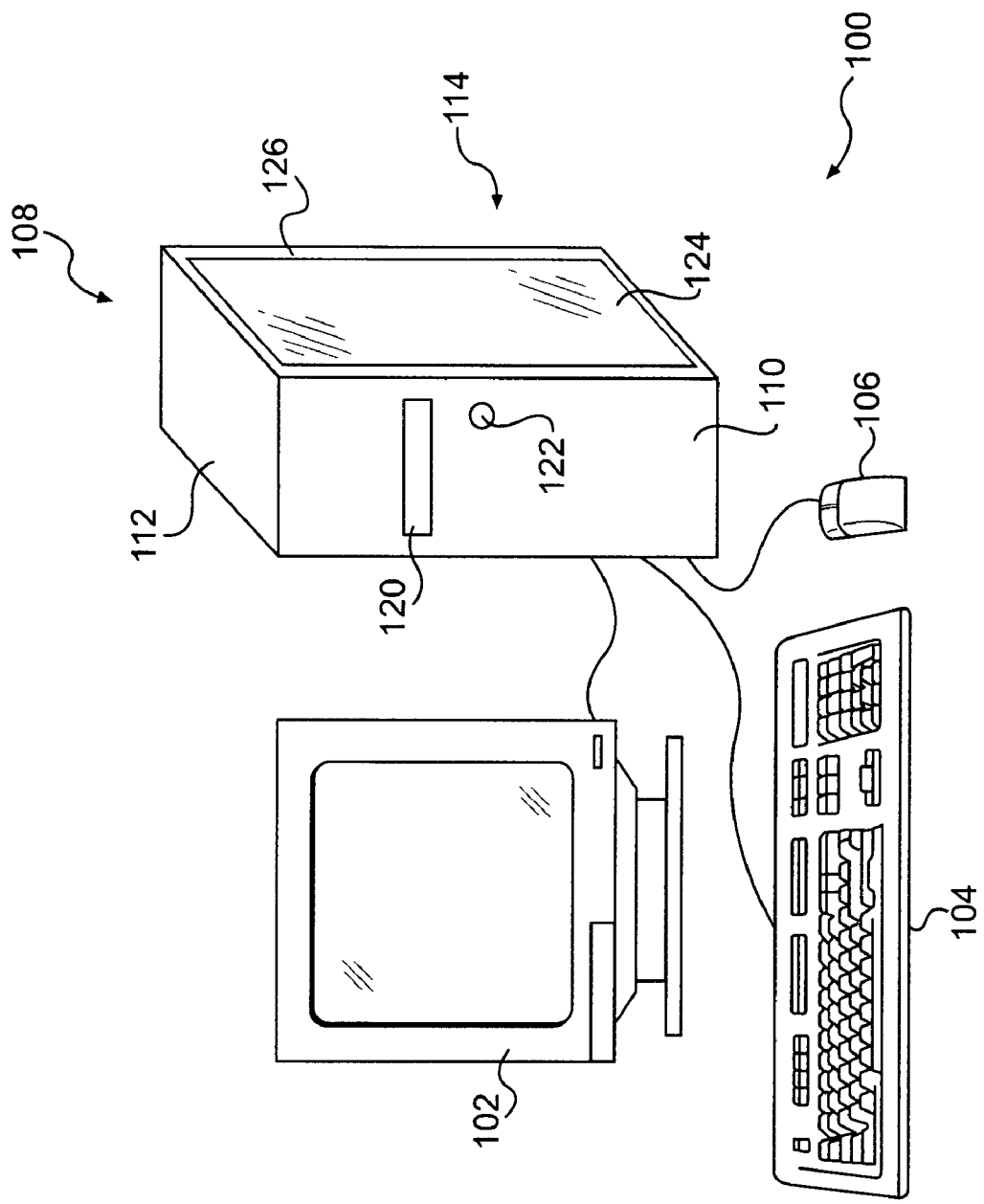
FIG. 1 is a perspective view of an exemplary desktop computer system, in accordance with an embodiment of the present invention.

FIG. 1 is a perspective view of an exemplary computer system 100, in accordance with an embodiment of the present invention. As illustrated, computer system 100 comprises a display device 102, keyboard 104, mouse 106, and computer case 108. Computer case 108 houses conventional components such as disk drives, storage devices, memory, processors, printed circuit boards, input/output cards, expansion cards, connectors, cables, power supplies, fans, etc. The computer hardware, along with software installed on the computer hardware, operates computer system 100. Display device 102, keyboard 104, and mouse 106 may be connected to different computer hardware components (e.g., a graphics card and universal serial bus (USB) port, respectively) through a wire or wireless connection. Other peripherals may also be connected to computer system 100 such as game controllers, printers, scanners, cameras, speakers, etc. In addition, computer system 100 may comprise interfaces for connecting to a network.

Computer case 108 comprises six case panels: a front case panel 110 and an opposing back case panel (not shown), a top case panel 112 and an opposing bottom case panel (not shown), and a right case panel 114 and an opposing left case panel (not shown). Front case panel 110 includes a disk drive slot 120. In this exemplary embodiment an active panel control dial 122 is provided. Front case panel 110, back case panel, top case panel 112, bottom case panel and left case panel are made of a suitable material, such as, for example, plastic, steel, aluminum, other metals and metal alloys, acrylic glass, cellulose-based material, or combination thereof. Each of the case panels may be connected together by fasteners, welds, releasable locks, etc. Also, a frame (not shown) may be provided for mounting each of the case panels together. In some embodiments that use a frame, the case may use fewer than six case panels. For example, a bottom case panel may not be included when a frame is used.

In this exemplary embodiment, right case panel 114 comprises an active panel 124 having a perimeter surrounded by a panel border 126. Panel border 126 may be, for example, made of the same type of material as the other panels in computer case 108. This embodiment of panel border 126 has a single opening or aperture in which active panel 124 is securely disposed.

Active panel 124 is made of a transformable material. A transformable material is any material in which the transparency of the material may be adjusted, preferably from clear (substantially transparent) to opaque (not transparent). In one embodiment, the transformable materials are liquid polymer materials commonly referred to as liquid crystals. Suitable examples of liquid crystals include those used in active or passive matrix liquid crystal displays, polymer dispersed liquid crystal (PDLC) devices, switchable glass, smart windows, photochromic substrates, electrochromic substrates, thermochromic substrates, electronic ink (E-ink) and other similar thin film laminates.

Although only right case panel 114 of computer case 108 comprises an active panel 124, in other embodiments, other case panels of computer case 108, may also include one or more active panels. The active panel(s) may comprise a variety of shapes and sizes and/or be positioned in a variety of locations in a case panel. FIGS. 2a-2d are perspective views of different embodiments of a case panel 114, referred to here as case panels 202a-202d, respectively, each having different shapes and quantities of active panels 200.

In FIG. 2a case panel 202a comprises an active panel 200a surrounded by a panel border 204a. Active panel 200a has an irregular shape having edges that are curves and straight lines.

In FIG. 2b, case panel 202b comprises six active panels, 200b, 200c, 200d, 200e, 200f, 200g surrounded by panel border 204b and separated by bridges 206a, 206b, 206c, 206d, 200e. Active panels 200b-200g may be configured and separately controlled to have a static or dynamic display of any desired transparency of any desired content. In one embodiment in which images are implemented, the content of the image may be a video or collection of several images, such as a photo book. In some embodiments, active panels 200b-200f may be independently controlled by one or more controllers. In an alternative embodiment, case panel 202b has one active panel 200 that is overlaid and separated with bridges 206a-206d.

In FIG. 2c case panel 202c comprises five active panels, 200h, 200i, 200j, 200k, 200l surrounded by panel border 204c and separated by bridges 206f, 206g, 206h, 206i. In this exemplary embodiment, active panels 200h and 200i are letter shapes, while the remaining active panels 200 in FIG. 2c are polygons. In FIG. 2c, active panels 200h and 200i may be controlled together separate from the other active panels 200j, 200k, and 200l. In other embodiments, there may be one active panel 200 for both letter shapes with a bridge 206f overlaid between the letters.

In FIG. 2d case panel 202d comprises four active panels 200w, 200x, 200y, 200z surrounded by panel border 204d. Panel border 204d has an extension 208 that blocks a portion of active panels 200w-200z, but extension 208 does not connect border 204d, similar to bridge 206. Active panels 200w-200z are not separated by a bridge, but may be independent of each other. A single controller may control each of the active panels 200 in FIG. 2d. In some embodiments, active panels 200 in FIG. 2d may be one active panel with extension 208 overlaid on top. In such embodiments active panel 200 may have four portions each of which may be independently controlled.

Although various configurations and arrangements of active panels are shown in FIGS. 2a-2d, it should be appreciated that other configurations and arrangements are contemplated by embodiments of the present invention. Additionally different types of transformable materials may be used for different active panels to achieve various configurations and arrangements. Such configurations and arrangements may be determined depending on the type and location of hardware components within the computer case.

Returning to FIG. 1, the transparency of active panel 124 may be controlled by a user using keyboard 104, mouse 106, and/or transparency control dial 122. In one embodiment, the user may dynamically control the transparency using hardware components, such as dial 122. In other embodiment, the user, manufacturer or other person or entity may configure a controller to control active panel 124. For example, in one embodiment, such a controller is a software program that automatically controls the active panel based on values established by the user, manufacturer, or other person or entity. Such a controller may include a graphical user interface through which a person may select, configure or otherwise determine the content to be displayed as well as the manner in which the transparency is changed. In other embodiments, the active panel controller may be responsive to one or more sensors that measure heat, light, etc.

Figure 3:
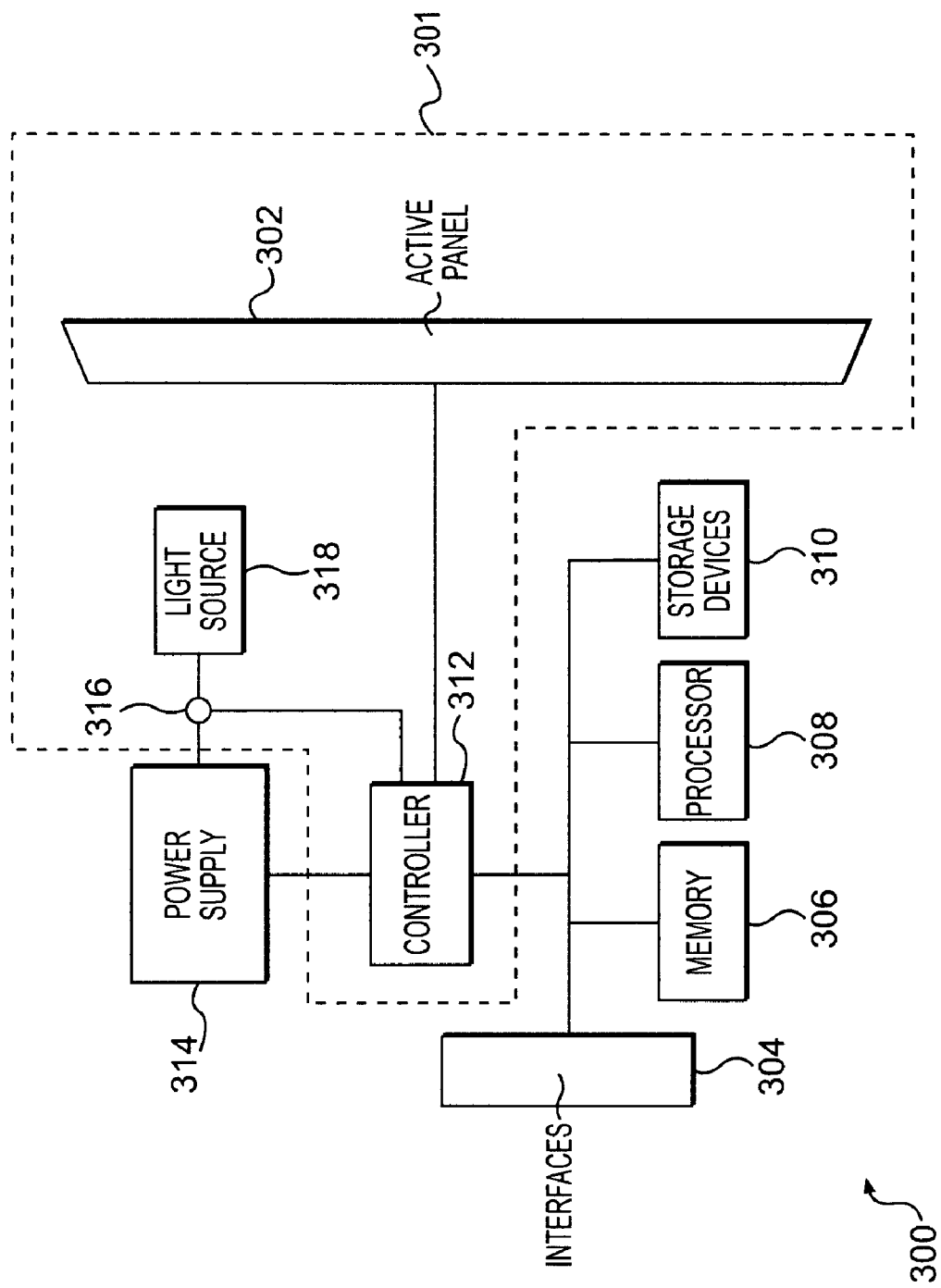
FIG. 3 is a block diagram of an active control system, in accordance with an embodiment of the present invention.

FIG. 3 is a block diagram of a computer 300 in which an embodiment of an active panel system 301 of the present invention may be implemented. Computer 300 comprises a memory 306, processor 308, power supply 314 and storage device 310. Memory 306 may comprise volatile memory elements such as random-access memory (RAM), dynamic RAM (DRAM), static (SRAM), etc., or nonvolatile memory elements such as read-only memory (ROM), flash memory, etc., or combinations thereof. Processor 308 may include any custom made or commercially available processing device such as a central processing unit (CPU), auxiliary processor, microprocessor, application-specific integrated circuit (ASIC), a plurality of suitably configured digital logic gates and other electrical processing configurations known now or later developed. Storage device 310 may comprise hard drives, optical drives, magnetic drives and/or combinations thereof. Input/output interface(s) 304 provide a communications interface with external user interface devices and other computers, servers and the like. For example, I/O interfaces 304 provide an interface to display devices, printers, networks, etc.

Active panel system 301 comprises, in this embodiment, one active panel 302, a controller 312 and an optional light source 318.

Active panel 302 is made of any the transformable materials described above. Controller 312 controls the operations of active panel 302 in response to, for example, user inputs, programmatic instructions, external processor commands, etc. In addition to controlling the transparency of active panel 302, in certain embodiments, controller 312 also controls the operational status of active panel 302 by regulating power from power supply 314. In some embodiments, active panel 302 may have several different pixels and controller 312 is configured to regulate the voltage for each pixel or group of pixels in active panel 302. The operations performed by controller 312 are described in greater detail below.

In one embodiment, controller 312 comprises a processor executing one or more software programs stored in a dedicated memory that is separate from memory 306. In one embodiment, controller 312 and associated circuitry are configured as an expansion card connected to a motherboard (not shown) of computer system 300. In alternative embodiments, controller 312 comprises one or more software programs that execute on processor 308 and are stored in memory 306.

In one embodiment, active panel system 301 may comprise a light source 318. Light source 318 may comprise, for example, incandescent, halogen, fluorescent, light-emitting diode (LED) device or other suitable light devices. Further, light source 318 may comprise a plurality of light devices which controller 312 may turn on independently. Light source 318 may produce different colors of light depending on the type of light source and user preferences. A suitable mount may be provided on one of the case panels for holding the light source.

In those embodiments in which active panel display system 301 implements a light source 318, controller 312 controls light source 318 as described elsewhere herein. This control may be implemented, for example, by controller 312 controlling the state of an in-line power switch 316 disposed between power supply 314 and light source 318.

Figure 4:
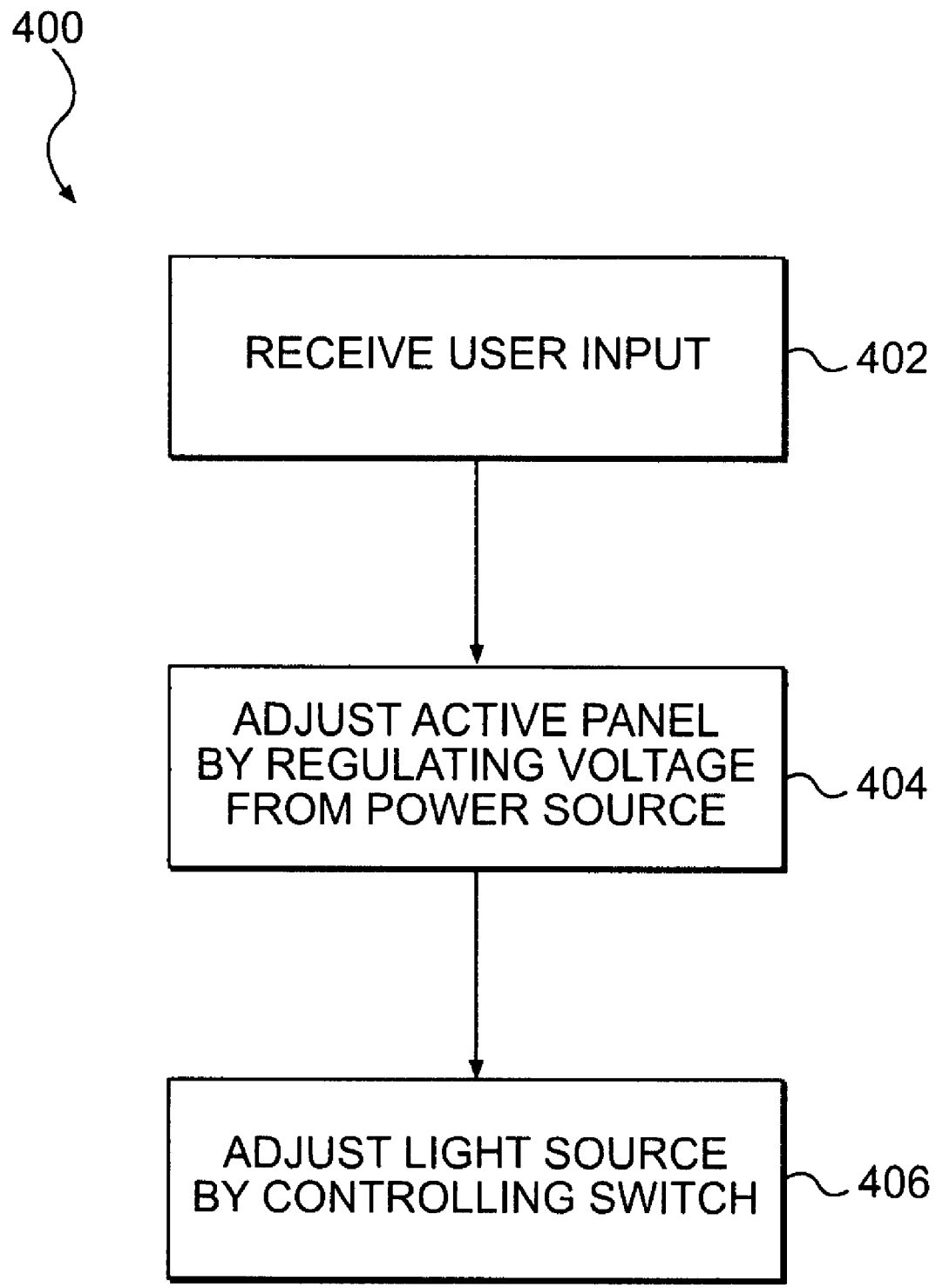
FIG. 4 is a flowchart for adjusting an active panel, in accordance with an embodiment of the present invention.

FIG. 4 is a flowchart illustrating the operations performed in accordance with an embodiment of the present invention. FIG. 4 will be described below with reference to the exemplary embodiments and application illustrated in FIGS. 1 and 3 and described above. Specifically, FIG. 4 addresses the operations performed in those embodiments in which the user controls the active panel.

At block 402, an active panel control input to adjust the transparency or opacity of active panel 302 is initiated by a user via a keyboard 104, mouse 106, touch screen, dial 122, or other user input device. Such a control signal is received by controller 312 through an I/O interface 304. Controller 312 has a separate processor and receives the user input. In response to the user input, controller 312 adjusts active panel 302, at block 404, by adjusting the voltage from power supply 314 to one or more portions of active panel 304. For example, a request to make the active panel transparent may involve controller 312 decreasing the voltage applied to active panel 302, while a request to make the active panel opaque may involve controller 312 increasing the voltage applied to active panel 302. Depending on the transformable material, controller 312 may switch the voltage on or off to thereby change the transparency of active panel 302. In addition, the user's input may be a request to controller 312 to regulate the voltage so that active panel 302 is semi-transparent or semi-opaque.

Next at block 406, controller 312 turns on light source 318 by controlling the state of switch 316. As part of the user input, the user's request indicates that light source 318 should be turned on. In other embodiments, controller 312 may automatically turn on light source 318 when active panel 302 is transparent or partially transparent. It should be noted that in some embodiments, blocks 404 and 406 may in any order without departing from the present invention.

Figure 5:
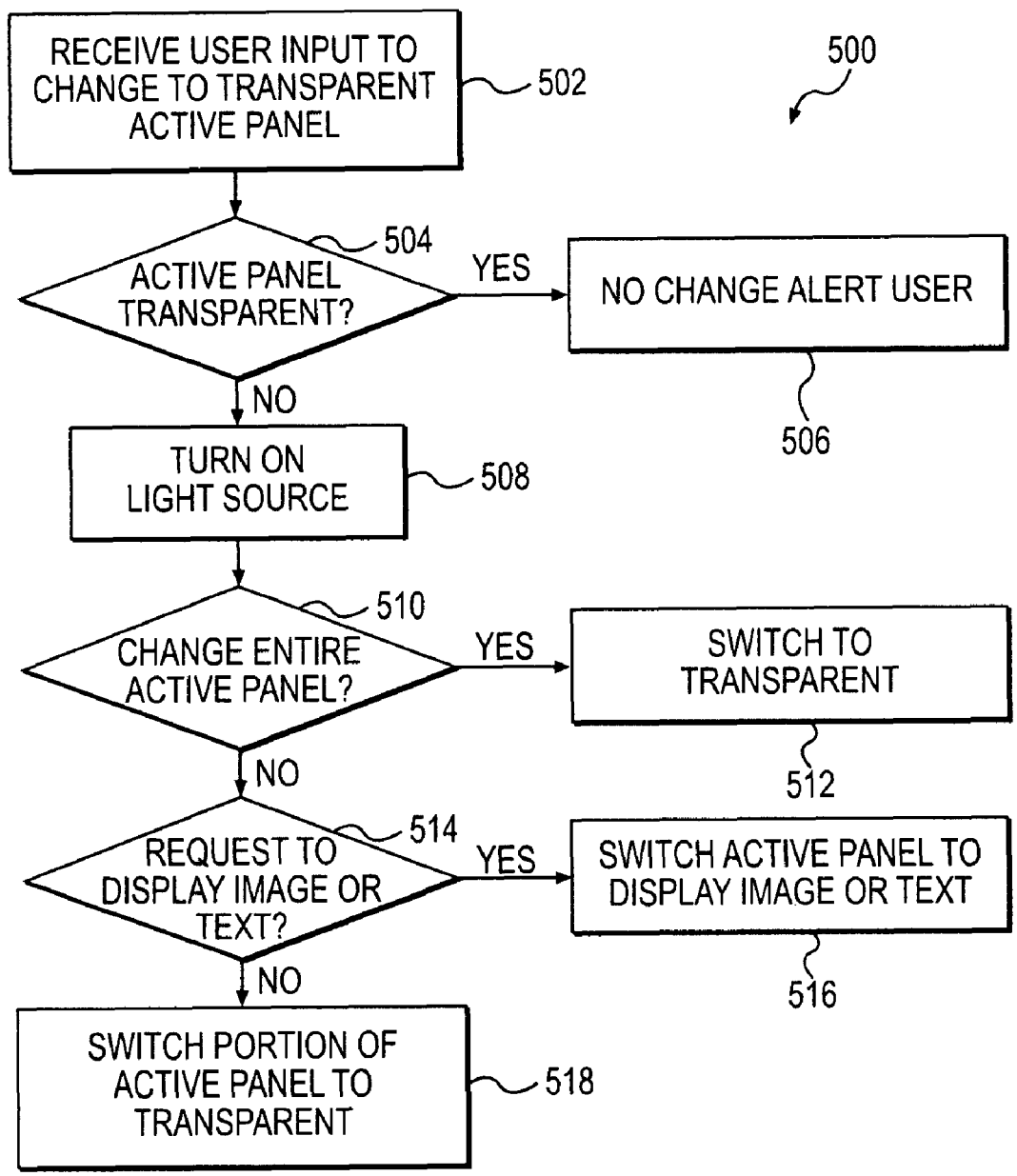
FIG. 5 is a flowchart for switching from an opaque to transparent active panel, in accordance with an embodiment of the present invention.
Figure 6:
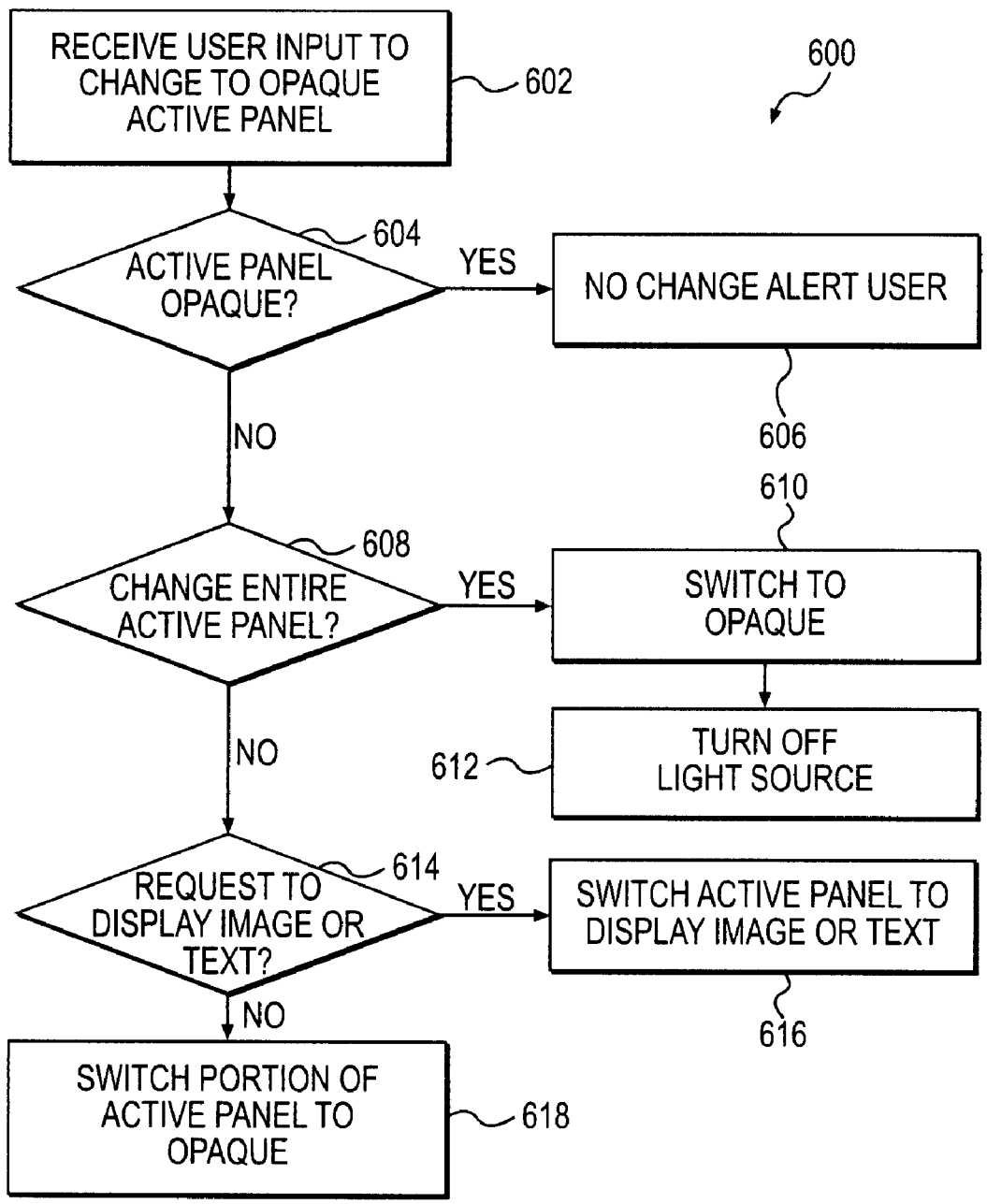
FIG. 6 is a flowchart for switching from an transparent to opaque active panel, in accordance with an embodiment of the present invention.

FIGS. 5 and 6 are flowcharts showing exemplary methods for switching from a substantially transparent or opaque active panel 302. FIGS. 5 and 6 will be described below with reference to the exemplary embodiments and applications illustrated in FIGS. 1 and 3 and described above. It should be noted that while FIGS. 5 and 6 show switching from a substantially transparent/opaque active panel 302, in other embodiments the switching may be from a semi-transparent or semi-opaque active panel 302.

Referring to FIG. 5, at block 502, controller 312 receives a signal indicating that a user requested that active panel 302 be changed to transparent. Such a user input may be to make the entire active panel 302 transparent, semi-transparent, or to display transparent images, graphics, text, etc. At decision block 504, controller 312 determines whether active panel 302 is currently transparent. When active panel 302 is currently transparent, controller 312, at block 506, transmits an alert such as a text on display 102 or aural cue to inform the user that the active panel is already transparent.

If at decision block 504 active panel 302 is determined to not be transparent, controller 312 turns on light source 318 by, for example, turning on switch 316, as discussed above. In some embodiments, controller 312 may partially turn on light source 318. Next, at decision block 510, controller 312 determines whether the user input was to turn the entire active panel 312 transparent. If so, at block 512, controller 312 regulates the supply of voltage to active panel 302 to make active panel 302 transparent. However, if not, then controller 312 determines, at decision block 514, whether the user input is to display a text or image. Such a text or image may require controller 312 to change only some of the active panel 302 transparent. This is achieved by controller 312 changing the voltage provided to the different pixels of active panel 302. The image may be stored in memory 306 or storage device 310 of computer system 300 and accessed by controller 312 upon receiving such a user input. In block 516, the requested image or text is displayed on active panel 302. However, when the user input is not to display text or an image, but a random or partially transparent active panel 302, controller 312 implements the input in block 518. Once active panel 302 is changed, the process may be repeated when controller 312 receives the next user input. Also, in some embodiments, active panel 302 may maintain the transparency set by method 500 when the computer system 302 is shut down.

For changing from a substantially transparent active panel to an opaque active panel, computer system 300 operates according to the method 600 shown by the flowchart of in FIG. 6. At block 602, controller 312 receives a user input to change a transparent active panel 302 to opaque, as described above. At decision block 604, controller 312 checks to determine whether active panel 302 is already opaque. When the active panel is already opaque, controller 312 alerts the user at block 606.

When at decision block 604, active panel 302 is not transparent, at decision block 608 controller 312 determines whether the user input was to turn the entire active panel 302 opaque. When yes, controller 312 in block 610 regulates the supply of voltage to active panel 302 to make active panel 302 opaque. Next in block 612, controller 312 turns off light source 318 automatically. However, when no at decision block 608, controller 312 at decision block 614 determines whether the user input is to display a text or image, as described above in FIG. 5. In block 616, the requested image or text is displayed on active panel 302. However, when the user input is not to display text or an image, but a random or partial opaque active panel 302, controller 312 implements the input in block 618. Once active panel 302 is changed, method 600 may be repeated when controller 312 receives the next user input. Also, in some embodiments, the active panel 302 may maintain the opacity set by the method of 600 when computer system 300 is shut down.

Figure 7:
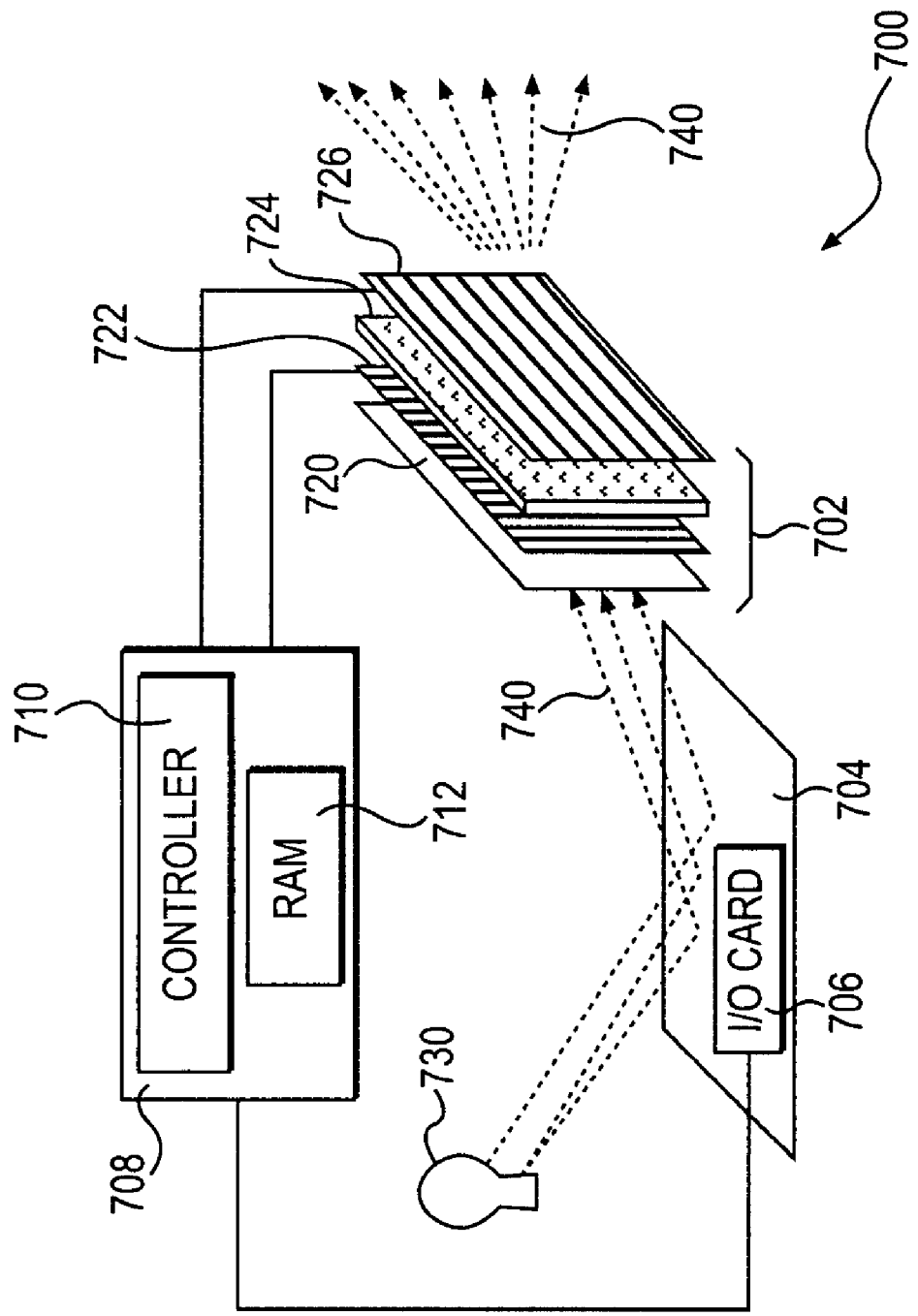
FIG. 7 is a functional diagram of computer system with a liquid crystal panel, in accordance with an embodiment of the present invention.

FIG. 7 is a schematic diagram of computer system 700 with a liquid crystal panel 702, in accordance with an embodiment of the present invention. Computer system 700 comprises a motherboard 704 having an I/O interface card 706 connected to an expansion card 708. Expansion card 708 comprises a liquid crystal controller 710 and RAM 712. Expansion card 708 is communicatively connected to motherboard 704 and may be mounted directly on motherboard 704. Further, as shown, expansion card 708 is connected to liquid crystal panel 702 that comprises several different layers including a polarized filter 720, y-conductive layer 722, liquid crystal layer 724 and x-conductive layer 726. Liquid crystal panel 702 is illuminated by LED light source 730 with light 740.

Computer system 700 operates by receiving a user input through I/O card 706. Computer system 700 writes this user input to RAM 712 on expansion card 708 as a group of bits. Each of the bits may correspond to a pixel on liquid crystal panel 702. It should be noted that this may vary depending on the number of pixels on liquid crystal panel 702. Controller 710 scans the bits out of RAM 712 and writes to the corresponding y-conductive layer 722 or x-conductive layer 726. The writing to the corresponding y-conductive layer 722 or x-conductive layer 726 alters the liquid crystal layer 724. It should be noted that the writing to the conductive layers may vary depending on the type of transformable material. When altered to a transparent liquid crystal panel 702, light 740 from light source 730 may reflect off motherboard 704 and pass through liquid crystal panel 702. The regulation of voltage by controller 710 changes the orientation of the individual liquid crystals in liquid crystal panel 702. This allows the user to see inside the computer case. The amount of light 740 that passes through the liquid crystal panel 702 varies depending on how many of the pixels are activated and the degree to which the individual pixels are activated.

Although the present invention has been fully described in conjunction with several embodiments thereof with reference to the accompanying drawings, it is to be understood that various changes and modifications may be apparent to those skilled in the art. For example, it should be appreciated by one of ordinary skill in the elements described above with reference to functional block diagrams may comprise more or less components than those illustrated or described, and that the functional divisions described herein are conceptual only and are provided to facilitate understanding of embodiments of the present invention. Such functional allocations, therefore, should not be construed as limiting in any way. Such changes and modifications are to be understood as included within the scope of the present invention as defined by the appended claims, unless they depart therefrom. Although FIG. 1 shows exemplary user input devices, in other embodiments the user input devices may also include controllers, touch screens, keypads, etc. Also, in FIG. 7, other processors, memory, and computer components may be mounted on motherboard 704. Further, in FIG. 7 the illustrated layers of liquid crystal panel 702 are exemplary and in other implementations liquid crystal panel 702 may have more or different types of layers. The present embodiments are, therefore, to be considered in all respects as illustrative and not restrictive.

All documents, patents, journal articles and other materials cited in the present application are hereby incorporated by reference.

What is claimed is:

1. A computer comprising:
   a plurality of case panels forming a computer housing, wherein at least one case panel comprises an active panel;
   a keyboard and pointing device configured to be separate from, but coupled to, said housing via at least one cable; and
   a controller configured to control the at least one active panel to adjust an amount of light that passes through the active panel;
   wherein the controller is communicatively connected to a user input and the controller adjusts the transparency of the active panel in response to a received request from the user input.

2. The computer of claim 1, further comprising a light source mountable in the computer case, wherein the light source supplies at least some of the light that passes through the active panel.

3. The computer of claim 2, wherein the controller is further configured to control the light source.

4. The computer of claim 2, wherein at least one of the plurality of case panels comprises a mount for a printed circuit board and wherein at least some of the light of the light source is reflected off the printed circuit board.

5. The computer of claim 1, wherein the active panel is at least partially made of a transformable material.

6. A computer comprising:
   a plurality of case panels forming a computer housing, wherein at least one case panel comprises an active panel;
   a keyboard and pointing device configured to be separate from, but coupled to, said housing via at least one cable; and
   a controller configured to control the at least one active panel to adjust an amount of light that passes through the active panel
   wherein the active panel is at least partially made of a liquid crystal panel.

7. The computer of claim 5, wherein the active panel comprises an opening and wherein the transformable material occupies the opening.

8. The computer of claim 6, wherein the liquid crystal panel has a plurality of pixels.

9. The computer of claim 8, wherein the controller is configured to activate at least some of the plurality of pixels to display an image on the liquid crystal panel.

10. A computer comprising:
    a plurality of case panels of which at least one case panel comprises an active panel; and
    a controller configured to control the at least one active panel to adjust an amount of light that passes through the active panel;
    wherein the controller automatically adjusts the transparency of the active panel in response to an input from a sensor.

11. The computer of claim 1, wherein the controller is further configured to regulate voltage supplied to the active panel.

12. A computer comprising:
    a plurality of case panels forming a computer housing, wherein at least one case panel comprises an active panel;
    a keyboard and pointing device configured to be separate from, but coupled to, said housing via at least one cable; and
    a controller configured to control the at least one active panel to adjust an amount of light that passes through the active panel;
    wherein the active panel comprises two or more portions each made of a transformable material and wherein the controller independently controls each of the two or more portions.

13. A method for adjusting the transparency of an active panel used in a computer case comprising:
    receiving a sensor input to adjust at least one active panel;
    adjusting an amount of light that passes through the at least one active panel in response to the received sensor input.

14. The method of claim 13, wherein receiving an input to adjust at least one active panel comprises:
    receiving a user input to adjust at least one active panel.

15. The method of claim 13, further comprising:
    supplying light from an internal light source.

16. The method of claim 15, further comprising:
    reflecting at least some of the light from the internal light source off on a printed circuit board mounted in the computer case.

17. A system for controlling transparency comprising:
    means for enclosing computer hardware and for allowing light to pass through; and
    means for adjusting a transparency of the means for enclosing based on a user input request.

18. The system of claim 17, further comprising:
    means for controlling a light source to illuminate at least a portion of the computer hardware.

* * * * *